Patented Oct. 10, 1950

2,524,800

UNITED STATES PATENT OFFICE 2,524,800

HYDROXYBENZENESULFONAMIDOHETERO-CYCLES AND PREPARATION OF SAME

Martin E. Hultquist, Bound Brook, N. J., and Yellapragada SubbaRow, deceased, late of Pearl River, N. Y., by Aloysius J. Bryant, administrator, South Nyack, N. Y., assignors to American Cyanamid Company, New York, N. Y., a corporation of Maine No Drawing. Application January 7, 1949, Serial No. 69,824

12 Claims. (Cl. 260—302)

This invention relates to new and useful sulfonamides and to methods of preparing the same.

It has been discovered that certain p-hydroxybenzenesulfonamido-heterocycles possess unexpected anti-viral activity, particularly in the neurotropic virus diseases and may, therefore, become important drugs in the treatment of these and related diseases. The new compounds of the present invention may be represented by the general formula:

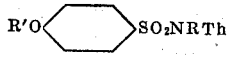

in which R represents hydrogen or an aliphatic, aralkyl or heterocyclic radical, Th represents a thiazoline, thiazolone, or thiazolidine radical attached to the amide nitrogen by a carbon linkage at the 2 position in the heterocyclic ring, and R' represents hydrogen or an acyl group. These radicals may bear one or more substituents at the remaining positions such as alkyl, aralkyl, carboxy, carbalkoxy, and the like. Obviously, tautomers of the above compounds may be formed and are included within the scope of said invention.

The hydrogen atom of the phenolic —OH radical as well as that attached to the amide nitrogen where R equals hydrogen are acidic in nature and may be replaced by simple neutralization or otherwise with a cationic radical of a metal or organic base. Such salts are of particular value especially in that the solubility of the compound is affected thereby, usually increased. Obviously such salts are included with the scope of the present invention.

The new p-hydroxybenzenesulfonamido heterocycles may be prepared by several distinct methods, the more important of which will be described in the specific examples which follow. The preferred method is by the hydrolysis of a suitable ester of a p-hydroxybenzenesulfonamido under either acidic or alkaline conditions whereby the —OH group is formed in the reaction. These esters which have the general formula

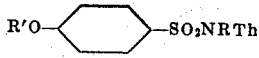

R' being an acyl radical, are believed to be new and are intended to be included within the scope of the invention. These esters are valuable per se as drugs since they may be hydrolyzed in the system.

To prepare the new acyl compounds of the present invention several methods are available. A preferred method involves the condensation of an appropriate acyloxy benzene sulfonyl halide with an aminothiazoline, aminothiazolone or aminothiazolidine in accordance with the following equation:

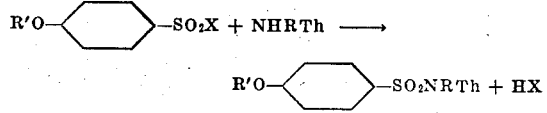

In the above R' is an acyl radical such as benzoyl, acetyl, furoyl, tosyl, carbethoxy or the like which may later be removed by hydrolysis. X is a halogen, preferably chlorine, but if desired fluorine or bromine.

Th is a heterocyclic radical such as mentioned above attached by a carbon atom of the heterocyclic ring.

To prepare intermediates in which R is an organic radical of the kind mentioned above, secondary amines such as 2-N-(beta-hydroxyethyl)-aminothiazoline,-thiazolone, or thiazolidine, or 2-(N-methylamino)-thiazoline,-thiazolone or -thiazolidine and the like are employed in the reaction.

The preferred method of effecting the condensation is to bring together the reactants shown in the above equation at 0° to 100° C. until condensation is completed. It is preferred that the condensation be conducted with the reactants dissolved or suspended in a tertiary nitrogen base such as pyridine or in an organic solvent containing a basic compound such as sodium carbonate or trimethylamine as acid acceptor or in an aqueous solution containing a substance which will react with the hydrohalide acid formed during the reaction and prevent it from interfering with the reaction.

Hydrolysis of the resulting compounds to convert the group R'O to HO— can be effected over a wide range of conditions. The temperature for the hydrolysis may range from about 0° to 150° C. with the preferred temperatures being between 50° and 100° C., but this may vary with the nature of the compound being hydrolyzed. Sodium hydroxide at a concentration of approximately 10% and in slight molecular excess, usually about 1 mol. is preferred. Other alkaline hydrolyzing agents including potassium hydroxide, barium hydroxide, calcium hydroxide, trimethylbenzylammonium hydroxide or other quaternary hydroxides, ammonia and the like may also be used. Conversion of the group R'O— to HO— can also be effected by hydrolysis under acidic conditions using hydrochloric acid, sulfuric acid or other known acid hydrolyzing agents.

The time for completion of the hydrolysis depends on several factors including temperature, concentration of the hydrolyzing agent, nature of the compounds, etc. Using, for example, sodium hydroxide at 10% concentration and at a temperature of 75° to 95° C., the hydrolysis is completed in about one hour.

Although hydrolysis is usually conducted under essentially aqueous conditions, the water may be replaced in part or largely with water miscible solvents such as alcohol. The presence of an inert water immiscible organic solvent in the reaction mixture is not precluded and, in fact, may offer advantages in some cases.

A distinct method of preparing the compounds of the present invention involves the use as starting material one of the known p-aminobenzenesulfonamido-thiazolines, -thiazolones or -thiazolidines. This process involves diazotization of the p-amino- group on the benzene ring followed by decomposition of the diazo compound under carefully controlled conditions so that a hydroxy group is formed. In general, the diazotization is carried out in the customary manner at 0° to 25° C. in 5% to 20% sulfuric acid using a slight excess of the theoretical amount of sodium nitrite. When the diazotization is complete the solution is heated to 50° to 80° C. to cause decomposition to take place. A flash decomposition carried out by passing the solution through a hot tube or through a steam gun is quite successful. A large excess of sulfuric acid may be used in the process, varying from 2 mols upwards. Decomposition is usually complete in 15 to 20 minutes at 80° C. Other acids such as hydrochloric, acetic, phosphoric and the like may, of course, be used to replace the sulfuric, if desired.

The invention will now be illustrated by the preparation of representative p-hydroxybenzenesulfonamide thiazolines, -thiazolones and -thiazolidines in the following examples. All parts are by weight unless otherwise indicated.

*Example 1*

A mixture of 15.9 parts of 2-amino-5-ethyl-4-thiazolone in 65 parts of pyridine is heated to 60° C. 23½ parts of 4-acetoxybenzenesulfonyl chloride are added over a period of 20 minutes while holding the temperature at 60–65° C. The reaction is held at this temperature for 30 minutes longer and then cooled to room temperature (30° C.). After 1 hour, the reaction is poured into 1000 parts of 1 N HCl while agitating rapidly and cooling in an ice bath. The product N-(5-ethyl-4-thiazolon 2-yl) 1 acetoxybenzene-4-sulfonamide is filtered and washed with cold salt water.

The above product is allowed to stand overnight at room temperature with a mixture of 20 cc. of 5 N HCl and 10 cc. of alcohol. Some crystalline material is present and more is obtained by dilution with water. Repeated recrystallization from water yield white silky needles of N-(5 - ethyl-4-thiazolon 2-yl)-1-phenol-4-sulfonamide melting at 199.5–200° C.

Analysis: Calcd. for $C_{11}H_{12}N_2O_4S_2$: C, 43.99; H, 4.03; N, 9.33; S, 21.35. Found: C, 43.8; H, 4.18; N, 9.30; S, 21.5.

*Example 2*

A mixture of 57.8 parts of 2-amino-5-methyl-4-thiazolone in 250 parts of pyridine is heated to 55° C. Eighty-seven parts of 4-acetoxybenzenesulfonyl chloride are added over a period of one hour while holding the temperature at 55–60° C. The reaction is held at this temperature for 30 minutes longer and then cooled to 25° C. The reaction is poured into 2500 parts of 1 N HCl while agitating rapidly and cooling in an ice bath. The product, N-(5-methyl-4-thiazolon-2-yl)-1-acetoxybenzene-4-sulfonamide, is separated, dissolved in a mixture of 250 parts of 2B alcohol and 300 parts of 5 N HCl and allowed to stand overnight at room temperature.

The reaction is diluted with 500 parts of water, neutralized to a pH of 3–4 with 5 N NaOH, and the alcohol removed by distillation at reduced pressure. The precipitate is filtered and repeatedly recrystallized from water to yield long white needles of N-(5-methyl-4-thiazolon-2-yl)-1-phenol-4-sulfonamide melting at 200–202° C.

Analysis calculated for $C_{10}H_{10}N_2O_4S_2$: C, 41.96; H, 3.52; N, 9.78; S, 22.40. Found: C, 41.7; H, 3.57; N, 10.25; S, 22.7.

*Example 3*

Seventy and one-half parts (0.3 mole) of 4-acetoxybenzensulfonyl chloride were added over a 2 hour period and with ice bath cooling to a mixture of 61.2 parts (0.6 mole) of 2-aminothiazoline and 150 parts of dry pyridine. The ice bath was removed and the mixture was allowed to stir for 4 hours longer. The reaction was filtered and the filtrate was poured into 1000 parts of cold water. The oil which separated was washed with water and then dissolved in 200 parts of 2B alcohol. Two hundred and fifty parts of 5 N HCl was added and the mixture was allowed to stand over night at room temperature (about 30–35° C.). The reaction was adjusted to pH 3 with 5 N NaOH and most of the alcohol was distilled off. An oil and some crystals separated. Fractional crystallization from water and alcohol yielded two products; N-(2-thiazolinyl)-1-phenol-4-sulfonamide and bis-(4-Hydroxyphenylsulfono)-2-aminothiazoline.

Mono. Calcd. for $C_9H_{10}N_2O_3S_2$: C, 41.85; H, 3.90; N, 10.85; S, 24.82. Found: C, 41.9; H, 4.08; N, 11.00; S, 24.6. M. P., 214–215°.

Bis. Calcd. for $C_{15}H_{14}N_2O_6S_3$: C, 43.45; H, 3.40; N, 6.76, S, 23.2. Found: C, 43.4; H, 3.57; N, 6.91; S, 23.2. M. P., 203–204°.

By following the above disclosed methods other p-hydroxy sulfonamidoheterocycles of the type described may be prepared such as N-(4-methyl-2-thiazolinyl) - 1 - phenol-4-sulfonamide N-(5-methyl-2 thiazolinyl) - 1 - phenol-4-sulfonamide N-(4,5-dimethyl-2 thiazolinyl) - 1 - phenol-4-sulfonamide N-(4-benzyl - 2 - thiazolinyl)-1-phenol-4-sulfonamide N-(5 5-dimethyl - 2 - thiazolon-4 yl)-1-phenol-4-sulfonamide N-(2-thiazolon-4 yl)-1-phenol-4-sulfonamide N-(2-thiazolidinyl)-1-phenol-4-sulfonamide N-(3-methyl-2-thiazolidinyl)-1-phenol-4-sulfonamide N-(3 - ethyl - 2 - thiazolinyl)-1-phenol-4-sulfonamide N-(3,5-methyl-4-carboxythiazolin-2-yl) - 1 - phenol-4-sulfonamide N-(5,5'-di-ethyl-2-thiazolon-4-yl)-phenol-4-sulfonamide by reaction of the appropriate intermediates.

Certain other p-hydroxysulfonamides and related compounds are set forth in applicants' copending application Serial Number 25,524 filed May 6, 1948.

The above compounds and others are also to be prepared by the diazotizing of the appropriate thiazolinyl-, thiazolonyl-, and thiazolidinyl-sulfanilamides.

What we claim is:

1. Compounds having the formula

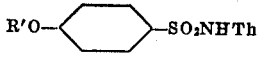

where R' is a member of the group consisting of hydrogen and acyl radicals and Th is a member of the group consisting of thiazolinyl, and thiazolonyl radicals; and salts of said compounds.

2. Compounds having the general formula

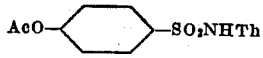

where Ac is an acyl group and Th is a thiazolinyl radical, and salts of said compounds.

3. Compounds of the general formula

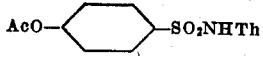

where Ac is an acyl radical and Th is a thiazolonyl radical, and salts of said compounds.

4. Compounds having the general formula

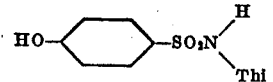

where Thi is a thiazoline radical.

5. N-(2-thiazolinyl)-1-phenol-4-sulfonamide.

6. Compounds having the general formula

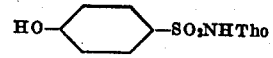

where Tho is a thiazolone radical.

7. N-(5-ethyl-4-thiazolon-2-yl)-1-phenol-4-sulfonamide.

8. N-(5-methyl-4-thiazolon-2-yl)-1-phenol-4-sulfonamide.

9. The method of preparing compounds having the formula

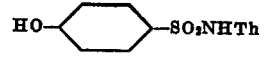

where Th is chosen from the group of thiazolines, and thiazolones which comprises hydrolyzing compounds of the general formula:

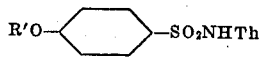

where R' is an acyl group, at a temperature in the range 0–150° C. and in the presence of a solvent capable of furnishing an OH group to the reaction and recovering the product.

10. In the preparation of N-(5-ethyl-4-thiazolon-2-yl)-1-phenol-4-sulfonamide the step which comprises hydrolyzing N-(5-ethyl-4-thiazolon-2-yl)-1-acetoxybenzene-4-sulfonamide until the acyl group is removed and recovering the N-(5-ethyl-4-thiazolon-2-yl)-1-phenol-4-sulfonamide.

11. In the preparation of N-(5-methyl-4-thiazolon-2-yl)-1-phenol-4-sulfonamide, the step which comprises hydrolyzing N-(5-methyl-4-thiazolon-2-yl)-1-acetoxybenzene-4-sulfonamide until the acyl group is removed, and recovering said product.

12. In the method of preparing N-(2-thiazolinyl)-1-phenol-4-sulfonamide and bis-(4 hydroxybenzensulfono) 2-aminothiazoline the steps which comprise hydrolyzing the reaction product of 4-acetoxybenzenesulfonylchloride and 2 aminothiazoline, and separating the above mentioned products by fractional crystallization.

MARTIN E. HULTQUIST.
ALOYSIUS J. BRYANT,
Administrator Estate of Yellapragada SubbaRow, Deceased.

REFERENCES CITED

The following references are of record in the file of this patent:

UNITED STATES PATENTS

| Number | Name | Date |
|---|---|---|
| 2,438,177 | Lott | Mar. 23, 1948 |

OTHER REFERENCES

Billon, Biologie Medicale, vol. 27, Supplement 1937, p. 84.

Kermack, J. Chem. Society (London), 1939, pp. 608–609.

Certificate of Correction

Patent No. 2,524,800 October 10, 1950

MARTIN E. HULTQUIST ET AL.

It is hereby certified that error appears in the printed specification of the above numbered patent requiring correction as follows:

Column 4, line 60, for that portion of the compound reading "N-(5 5-dimethyl" read *N-(5,5-dimethyl;* and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*